United States Patent [19]
Mager

[11] 3,973,691
[45] Aug. 10, 1976

[54] FLUORESCENT LAMP HAVING IMPROVED PHOSPHOR COATING

[75] Inventor: Eric L. Mager, Beverly, Mass.

[73] Assignee: GTE Sylvania Incorporated, Danvers, Mass.

[22] Filed: Oct. 21, 1974

[21] Appl. No.: 516,720

[52] U.S. Cl. ............................ 220/2.1 R; 313/486
[51] Int. Cl.² ........................................ H01J 61/44
[58] Field of Search ............. 220/2.1 R, 2.2, 2.3 R; 313/484, 485, 486, 487, 489

[56] References Cited
UNITED STATES PATENTS

| | | | |
|---|---|---|---|
| 2,235,802 | 3/1941 | Lemaigre-Voreaux | 313/487 |
| 3,513,346 | 5/1970 | Awazu et al. | 313/486 |
| 3,651,363 | 3/1972 | Barry | 313/486 |
| 3,748,516 | 7/1973 | Blasse et al. | 313/486 |

Primary Examiner—Richard E. Aegerter
Assistant Examiner—L. Footland
Attorney, Agent, or Firm—James Theodosopoulos

[57] ABSTRACT

A fluorescent lamp has a phosphor coating on the inner surface of its glass envelope. The phosphor coating contains a small amount of barium carbonate admixed therewith. The barium carbonate improves the light output maintenance of the lamp.

2 Claims, No Drawings

FLUORESCENT LAMP HAVING IMPROVED PHOSPHOR COATING

THE INVENTION

I have found that the addition of barium carbonate ($BaCO_3$) to the phosphor coating of fluorescent lamps results in more initial light output, and also in better maintenance of light output during the operating life of the lamps. In other words, the amount of light (measured in lumens) initially emitted is greater, and during subsequent burning time of lamps embodying this invention, the light output decreases from its initial value at a slower rate than usual.

This improvement in fluorescent lamp performance has been found to be especially pronounced in the case of circular fluorescent lamps having an adhesion-promoting amount of a powdered glass frit admixed with the light-emitting phosphor coating, which may preferably be mostly halophosphates. An example of a circular fluorescent lamp is shown in U.S. Pat. No. 3,546,523. In the manufacture of such a lamp, the phosphor coating is usually applied to the inner wall of a straight tubular lamp envelope, before it is bent into a circular shape. The coating is dried and is then baked at a temperature of about 600°C to eliminate organic binders. The mounts are then sealed into the ends of the envelope and then the envelope, which is usually made of soft lead glass having a working temperature of about 700°–800°C, is heated to its working temperature and is bent into the desired circular shape.

In a phosphor coating in accordance with this invention, any effective amount of barium carbonate may be used, and the optimum amount may vary depending on other lamp parameters. I have used amounts of $BaCO_3$ in the range from about 0.04% to 1.0% of the dry phosphor weight. For Cool White circline lamps I have preferably used amounts of barium carbonate in the range 0.3% to 0.5%.

By way of example, the following specific embodiment of the invention may be cited:

Vehicle

| | | |
|---|---|---|
| Ethylcellulose N-200 | 50 | grams |
| Dibutyl Phthalate | 23 | ml |
| Xylene | 1940 | ml |
| N-Butanol | 290 | ml |

This composition is thoroughly mixed, and then may be rolled, stirred or otherwise agitated until a uniform liquid dispersion is obtained. If desired, the vehicle may be filtered, preferably under pressure.

Fluorescent Phosphor Suspension

| | | |
|---|---|---|
| Vehicle (prepared as above) | 2000 | ml |
| Phosphor (e.g., cool white halophosphate) | 2722 | grams |
| Dispersing agent (e.g., amine-type) | 20 | grams |
| Aluminum Oxide (finely divided) | 16 | grams |
| Glass Frit (finely divided) | 109 | grams |
| Barium Carbonate ($BaCO_3$) | 11 | grams |

This mixture may be ball-milled, if desired, to improve the texture of fluorescent-lamp coatings made from it. For such milling, I prefer to use smooth flint pebbles in a porcelain jar mill.

Following are some test results exemplifying the application of this invention in Cool White Circline Fluorescent Lamps. In each experiment a group of test lamps containing an addition of barium carbonate similar to that set forth above are compared to a group of control lamps prepared identically to the test lamps of that experiment except for the omission of barium carbonate. The average quantity of light (lumens) emitted per lamp is given for each group initially (0 hours) and then at stated intervals during the subsequent operation of the lamps.

| Test No. 22X1 (FC8T9 22 watt Circline Lamps) | | | |
|---|---|---|---|
| | Control | Test (0.3% $BaCO_3$) | |
| 0 Hours | 1325 | 1355 | |
| 100 Hours | 1222 | 1247 | |
| 500 Hours | 1120 | 1164 | |
| 1750 Hours | 988 | 1038 | |
| Test No. 22X2 (FC8T9 22 watt Circline Lamps) | | | |
| | Control | Test (0.04% $BaCO_3$) | |
| 0 Hours | 1316 | 1303 | |
| 100 Hours | 1155 | 1171 | |
| 500 Hours | 1058 | 1083 | |
| Test No. 22X4 (FC8T9 22 watt Circline Lamps) | | | |
| | Control | Test (0.5%) | (1.0%) |
| 0 Hours | 1304 | 1311 | 1315 |
| 100 Hours | 1174 | 1262 | 1250 |
| 500 Hours | 1055 | 1226 | 1206 |
| Test No. 22X7 (FC8T9 22 watt Circline Lamps) | | | |
| | Control | Test (0.4% $BaCO_3$) | |
| 0 Hours | 1344 | 1348 | |
| 100 Hours | 1260 | 1287 | |
| 500 Hours | 1212 | 1222 | |
| 1750 Hours | 1074 | 1084 | |
| 3000 Hours | 1006 | 1040 | |
| Test No. 32X3 (FC12T10 32 watt Circline Lamps) | | | |
| | Control | Test (0.3% $BaCO_3$) | |
| 0 Hours | 2207 | 2160 | |
| 100 Hours | 2090 | 2118 | |
| 500 Hours | 1959 | 2018 | |
| 1750 Hours | 1634 | 1863 | |
| Test No. 32X8 (FC12T10 32 watt Circline Lamps) | | | |
| | Control | Test (0.4% $BaCO_3$) | |
| 0 Hours | 2151 | 2172 | |
| 100 Hours | 2038 | 2104 | |
| 500 Hours | 1887 | 2013 | |
| 1750 Hours | 1642 | 1798 | |
| Test No. 16T10X1 (FC16T10 40 watt Circline Lamps) | | | |
| | Control | Test (0.4% $BaCO_3$) | |
| 0 Hours | 3074 | 3094 | |
| 100 Hours | 2851 | 2928 | |
| 500 Hours | 2710 | 2817 | |
| 1750 Hours | 2380 | 2531 | |
| 3000 Hours | 2336 | 2462 | |

It can be seen that the barium carbonate generally improves initial light output slightly. However, light output maintenance is significantly improved in all cases. The minimum improvement was 1.9% after 1750 hours operation for the 22 watt eight inch circular lamp containing 0.3% $BaCO_3$ (test no. 22X1); the maintenance for the control lamps and test lamps were 74.5% and 76.4%, respectively. The maximum improvement was 12.3% after 1750 hours for the 32 watt twelve inch circular lamp containing 0.3% $BaCO_3$ (test no. 32X3); the maintenance for the control lamps and test lamps were 74.0% and 86.3% respectively. Test no. 22X4, containing 0.5% $BaCO_3$, also showed a 12.3% improvement in maintenance, after 500 hours.

I claim:

1. A fluorescent lamp having a phosphor coating on the inner surface of the lamp envelope, said coating containing a small amount of barium carbonate, the quantity of barium carbonate in the coating being less than about 1% of the weight of the phosphor, for more initial light output and better maintenance of light output.

2. The lamp of claim 1 wherein said quantity of barium carbonate is about 0.3 to 0.5% of the weight of the phosphor.

* * * * *